(12) United States Patent
Aoyama (10) Patent No.: US 6,741,451 B2
(45) Date of Patent: May 25, 2004

(54) SOLID ELECTROLYTIC CAPACITOR AND METHOD OF MAKING THE SAME

(75) Inventor: Makoto Aoyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/446,751

(22) Filed: May 28, 2003

(65) Prior Publication Data
US 2003/0223180 A1 Dec. 4, 2003

(30) Foreign Application Priority Data
May 30, 2002 (JP) ........................................ 2002-157703

(51) Int. Cl.⁷ ................................................. H01G 9/04
(52) U.S. Cl. ...................... 361/528; 361/523; 361/529; 361/532; 29/25.03
(58) Field of Search ................................. 361/523, 524, 361/529, 530, 531, 532; 29/25.03

(56) References Cited

U.S. PATENT DOCUMENTS 5,005,107 A  * 4/1991 Kobashi et al. ............. 361/540
5,729,428 A  * 3/1998 Sakata et al. ................ 361/523
6,154,358 A  * 11/2000 Fukaumi et al. ............ 361/523
6,219,223 B1 * 4/2001 Kobayashi et al. ......... 361/523
6,324,051 B1 * 11/2001 Igaki et al. .................. 361/523
6,411,498 B2 * 6/2002 Nakamura ................... 361/523
6,552,896 B1 * 4/2003 Igaki et al. .................. 361/523

FOREIGN PATENT DOCUMENTS

JP          3-30977          5/1991

* cited by examiner

Primary Examiner—Anthony Dinkins
(74) Attorney, Agent, or Firm—Merchant & Gould P.C.

(57) ABSTRACT

A solid electrolytic capacitor includes a capacitor element and a resin package enclosing the capacitor element. Two anode leads, partially enclosed by the package, are connected to the opposite ends of the anode bar that are allowed to protrude in the opposite directions from an anode chip of the capacitor element. The capacitor element is provided with a cathode layer connected to an external cathode electrode arranged between the paired anode leads. With this symmetrical structure of two anode leads and one cathode electrode, the solid electrolytic capacitor can be mounted onto a printed circuit board without worrying about the polarity of the capacitor. Further, the proximity of the cathode electrode and the respective anode leads serves to reduce the self-induction in a high-frequency range.

5 Claims, 6 Drawing Sheets

SOLID ELECTROLYTIC CAPACITOR AND METHOD OF MAKING THE SAME

BACKGROUND OF THE INVENTION

1. Field of the Invention

The present invention relates to a solid electrolytic capacitor for which valve metal such as tantalum, niobium or aluminum is used. It also relates to a method of making such a solid electrolytic capacitor.

2. Description of the Related Art

A conventional solid electrolytic capacitor of the above-mentioned type is disclosed in e.g. Japanese Patent Kokoku Publication No. 3(1991)-30977. The conventional capacitor includes a capacitor element, anode and cathode leads connected to the capacitor element, and a resin package enclosing the capacitor element. The anode lead is arranged at one side of the package, while the cathode lead is arranged at the opposite side.

The capacitor element used in such a solid electrolytic capacitor has a prescribed polarity so that the capacitor can function properly only when connected in the correct polarity direction. However, it is sometimes difficult to distinguish between the anode lead and the cathode lead in the conventional capacitor, since each lead is arranged at an end of the package in a similar manner. Accordingly, the conventional capacitor is liable to be mounted on a printed circuit board in the wrong polarity direction.

Further, in the conventional capacitor, the anode lead and the cathode lead are rather widely spaced away from each other since they are disposed at the opposite ends of the package. Unfortunately, this increases the self-induction of the capacitor in a high frequency range.

SUMMARY OF THE INVENTION

The present invention has been proposed under the circumstances described above. It is, therefore, an object of the present invention to provide a solid electrolytic capacitor having an advantageous lead arrangement that can overcome the polarity problem and the self-induction problem accompanying the prior art device. Another object of the present invention is to provide a method of making such a solid electrolytic capacitor.

According to a first aspect of the present invention, there is provided a method of making a solid electrolytic capacitor. The method comprises the steps of: preparing an anode chip made of a valve metal and including a first surface and a second surface opposite to the first surface, the anode chip being provided with an anode bar protruding from the first surface and the second surface of the chip; forming a dielectric layer on the anode chip by anodization; enclosing, by a removable cover, a portion of the anode bar that protrudes from the second surface of the anode chip; forming a solid electrolytic layer by immersing the anode chip in a solid electrolytic layer-forming solution and then baking the anode chip; forming a cathode layer on the solid electrolytic layer; removing the cover; mounting a capacitor element produced by the above-mentioned steps on a metal leadframe, so that portions of the anode bar protruding from the first and the second surfaces of the anode chip are connected to paired anode leads of the leadframe, respectively, and that the cathode layer on the anode chip is connected to a cathode lead of the leadframe that is arranged between the paired anode leads; enclosing the capacitor element by a synthetic resin package in a manner such that the paired anode leads are exposed at opposite ends of the package, and that the cathode lead is exposed at a portion of the package located between the paired anode leads; and cutting the paired anode leads and the cathode lead off the leadframe.

In a solid electrolytic capacitor produced by the above method, two opposite anode leads are located at the opposite ends of the resin package, respectively, and the single cathode is arranged between the paired anode leads. With this symmetrical lead layout, the capacitor can be mounted on a printed circuit board with one correct polarity orientation and also with the reversed orientation. Accordingly, the operator can perform the mounting of the capacitor without worrying about the polarity alignment.

Further, by the middle positioning of the cathode lead between the two anode leads, the distance between the cathode lead and each anode lead is made smaller than is conventionally possible. Accordingly, the self-induction in a high-frequency range can be significantly reduced, whereby the capacitor performance in that range is improved.

According to the above method, the solid electrolytic layer-forming step and the cathode layer-forming step are performed with the protrusion of the anode bar from the anode chip's second surface enclosed by a cover. Thus, it is possible to prevent the particular protrusion of the anode bar from being formed with a solid electrolytic layer or a cathode layer.

Preferably, the enclosing step by the cover for the anode bar may be performed before the forming step of the dielectric layer on the anode chip. In this manner, no dielectric layer (i.e. insulating layer) is formed on the covered protrusion of the anode bar, whereby a reliable electrical connection can be established between the anode bar's protrusion and the relevant anode lead.

Preferably, the anode bar may be welded to the paired anode leads, while the cathode layer may be bonded to the cathode lead by a conductive paste. In this manner, the electrical connection between the capacitor element and the leads can be made with ease and at a low cost.

According to a second aspect of the present invention, there is provided a solid electrolytic capacitor that comprises a capacitor element produced by the steps of: preparing an anode chip made of a valve metal and including a first surface and a second surface opposite to the first surface, the anode chip being provided with an anode bar protruding from the first surface and the second surface of the chip; forming a dielectric layer on the anode chip by anodization; enclosing, by a removable cover, a portion of the anode bar that protrudes from the second surface of the anode chip; forming a solid electrolytic layer by immersing the anode chip in a solid electrolytic layer-forming solution and then baking the anode chip; forming a cathode layer on the solid electrolytic layer; and removing the cover. Further, the capacitor of the present invention includes: a first anode lead connected to a portion of the anode bar that protrudes from the first surface of the anode chip; a second anode lead connected to a portion of the anode bar that protrudes from the second surface of the anode chip; a cathode lead connected to the cathode layer formed on the anode chip, the cathode lead being arranged between the paired anode leads; and a synthetic resin package enclosing the capacitor element. The paired anode leads are exposed at opposite ends of the package, while the cathode lead is exposed at a portion of the package between the paired anode leads.

According to a third aspect of the present invention, there is provided a solid electrolytic capacitor comprising: an anode chip including a first surface and a second surface opposite to the first surface; an anode bar including a first portion protruding from the first surface of the chip and a second portion protruding from the second surface of the chip; a cathode layer formed on the anode chip; a first anode lead connected to the first portion of the anode bar; a second anode lead connected to the second portion of the anode bar; a cathode lead connected to the cathode layer; and a resin package enclosing the anode chip and the anode bar, the package including a first end portion and a second end portion opposite to the first end portion. The first anode lead is exposed at the first end portion of the package, the second anode lead is exposed at the second end portion of the package, and the cathode lead is exposed at a location between the first anode lead and the second anode lead.

Other features and advantages of the present invention will become apparent from the detailed description given below with reference to the accompanying drawings.

DETAILED DESCRIPTION OF THE PREFERRED EMBODIMENTS

Preferred embodiments of the present invention will be described below with reference to the accompanying drawings.

Reference is first made to FIGS. 1–11 illustrating a first embodiment of the present invention.

According to the first embodiment, a solid electrolytic capacitor is produced by a process described below.

Figure 1:
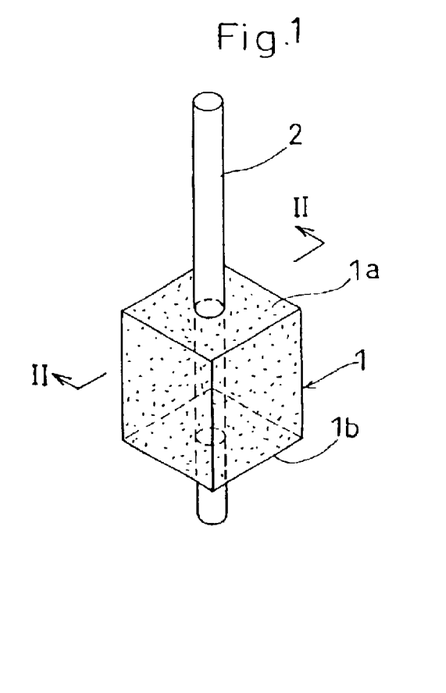
FIG. 1 is a perspective view showing an anode chip used for the first embodiment of the present invention.
Figure 2:
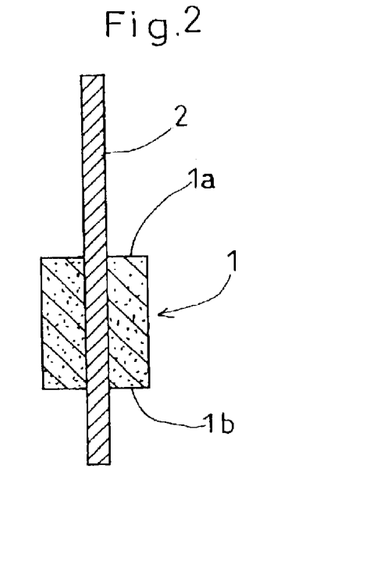
FIG. 2 is a sectional view taken along lines II—II in FIG. 1.

First, a powder of valve metal such as tantalum or niobium is compressed into a chip 1, as shown in FIGS. 1 and 2. At this stage, an anode bar 2 is embedded partially in the anode chip 1 in a manner such that one end of the bar 2 projects from a surface 1*a* of the chip 1, while the other end projects from the opposite surface 1*b* of the chip 1. In the illustrated embodiment, as seen from FIG. 2, the bar end projecting from the surface 1*a* of the chip 1 is longer than the other end projecting from the opposite surface 1*b* of the chip 1. The anode bar 2 is made of the same valve metal as the anode chip 1.

Figure 3:
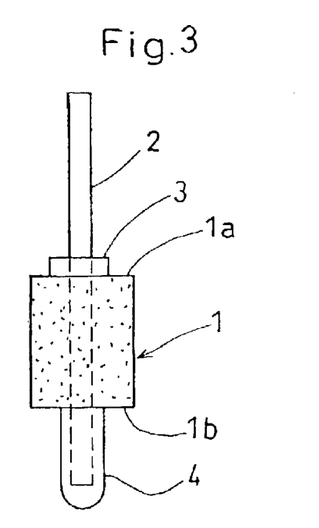
FIG. 3 shows the anode chip provided with a ring and a cover which are put around or on the relevant one of the protrusions of the anode bar.

Then, as shown in FIG. 3, a ring 3 made of a water-repellant synthetic resin is fitted around the longer protrusion of the bar 2 so as to be held in contact with the surface 1*a* of the chip 1. The shorter protrusion of the bar 2, on the other hand, is enclosed by a removal cover 4 made of a synthetic resin. The cover 4 is a hermetically-sealing sheath that can be capped on the shorter protrusion. Instead of using such a cover, the protrusion of the bar 2 may be coated with a resin material that can be readily removed later.

Figure 4:
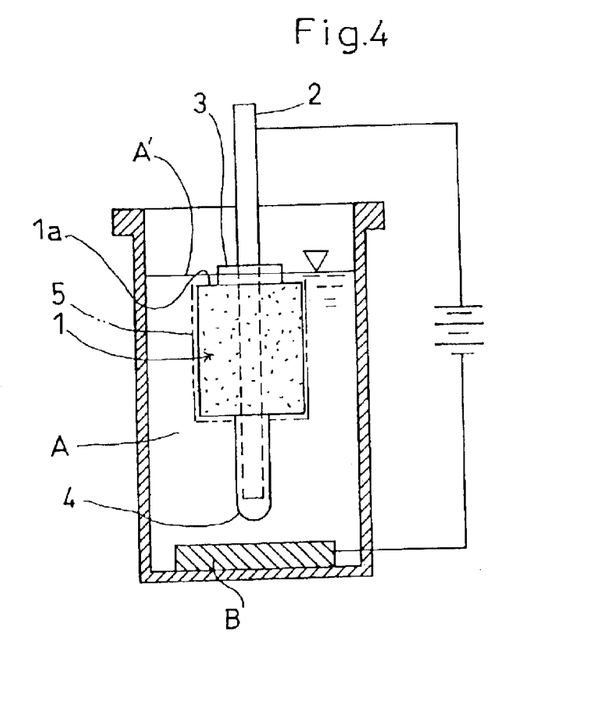
FIG. 4 illustrates an anodization step performed for the anode chip of FIG. 1.

Then, as shown in FIG. 4, the anode chip 1 is immersed in a reactive solution A such as a phosphoric acid solution. At this time, with the surface 1*a* of the anode chip 1 directed upward, the entire body of the chip 1 is put into the solution A until the solution level A' comes up to a middle point of the water-repellent ring 3. Below the anode chip 1 in the solution A, there is an electrode B connected to a power source. In this arrangement, direct voltage is applied between the electrode B and the anode bar 2 to perform anodization for forming a dielectric layer (e.g. tantalum pentoxide) 5 on the metal particles of the anode chip 1.

According to the present invention, the formation of the dielectric layer 5 may be performed before the ring 3 and the cover 4 are put on the protrusions of the anode bar 2.

Figures 5, 6, 7:
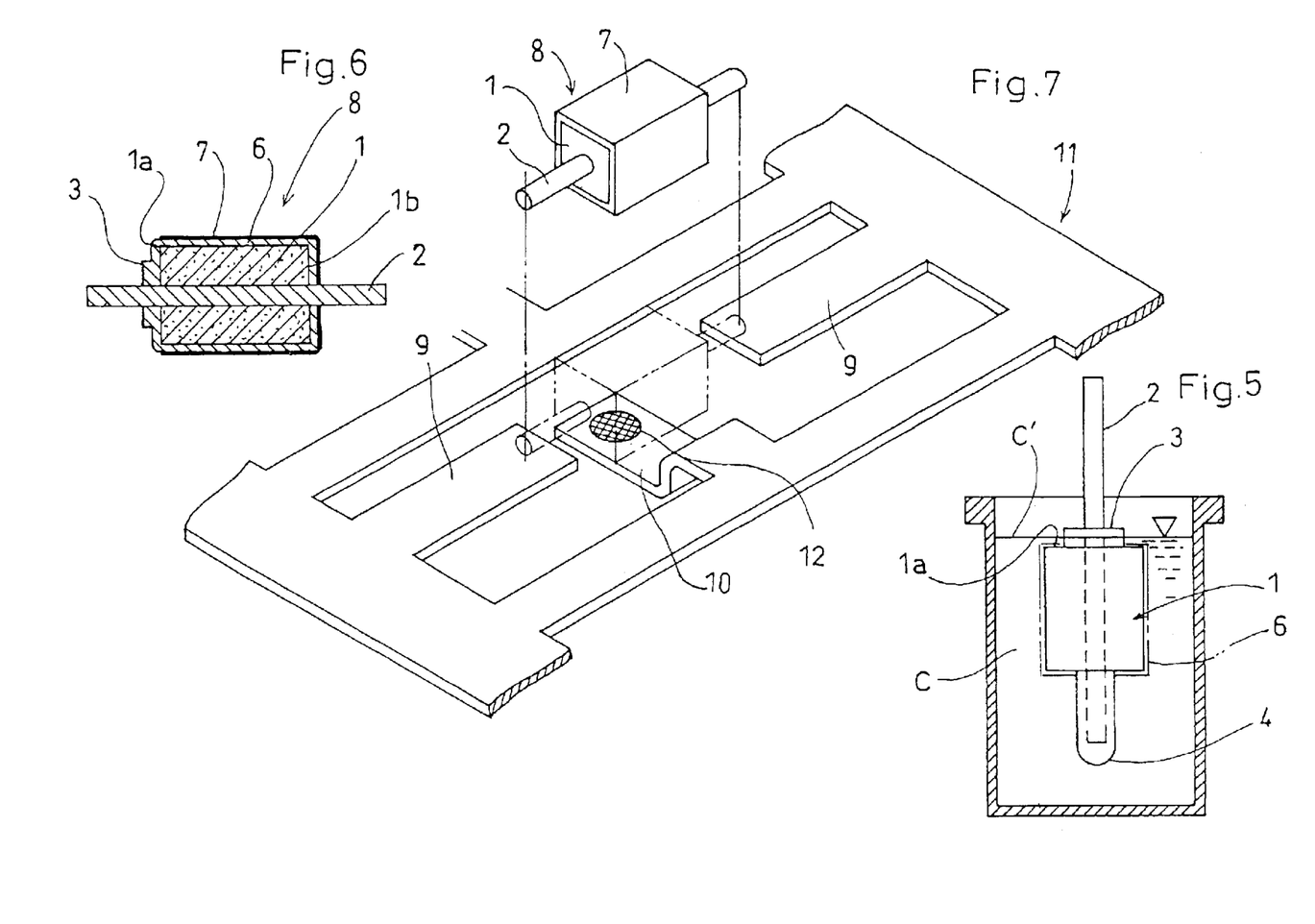
FIG. 5 illustrates a solid electrolytic layer-forming step performed after the anodization step shown in FIG. 4.
FIG. 6 is a sectional view showing a capacitor element by the first embodiment of the present invention.
FIG. 7 is a perspective view showing a leadframe used for the first embodiment of the present invention.

Then, as shown in FIG. 5, the anode chip 1 is immersed in a solution C for forming solid electrolytic layers. This solution may be an aqueous solution of e.g. manganese nitrate. At this time, the end surface 1*a* of the anode chip 1 is directed upward, and the ring 3, held in contact with the end surface 1*a*, is partially dipped under the surface C' of the aqueous solution, as in the anodizing step shown in FIG. 4. After the solution C has penetrated well into the anode chip 1, the anode chip 1 is taken out of the solution C, and then baked. The immersion and the baking for the chip may be repeated several times. As a result, solid electrolytic layers 6, made of metallic oxide such as manganese dioxide, are formed on the dielectric layer 5 of the anode chip 1.

Then, a cathode layer 7 is formed on the electrolytic layer 6 of the chip 1. The cathode layer 7 consists of a graphite lining sub-layer and a metal upper sub-layer made of silver or nickel, for example.

In the above method, the anode bar's shorter portion (which projects from the end surface 1*b* of the chip 1) is shielded by the cover 4. Thus, it is possible to prevent the shorter protrusion of the bar 2 from being coated by the dielectric layer 6 and the cathode layer 7.

Then, the cover 4 is removed. Thereafter, both the longer and the shorter protrusions of the bar 2 are trimmed to the prescribed lengths. Thus, the capacitor element 8 as shown in FIG. 6 is obtained.

Meanwhile, a metal leadframe 11 (only a part of which is shown in FIG. 7) is prepared. The leadframe 11 includes a prescribed number of lead sets each consisting of two anode leads 9 and one cathode lead 10 disposed between the anode leads 9, as shown in FIG. 7. The paired anode leads 9, aligned with a common imaginary line (not shown) perpendicular to the longitudinal direction of the leadframe 11, extend toward each other from the relevant side bars of the leadframe 11.

Figures 8, 9:
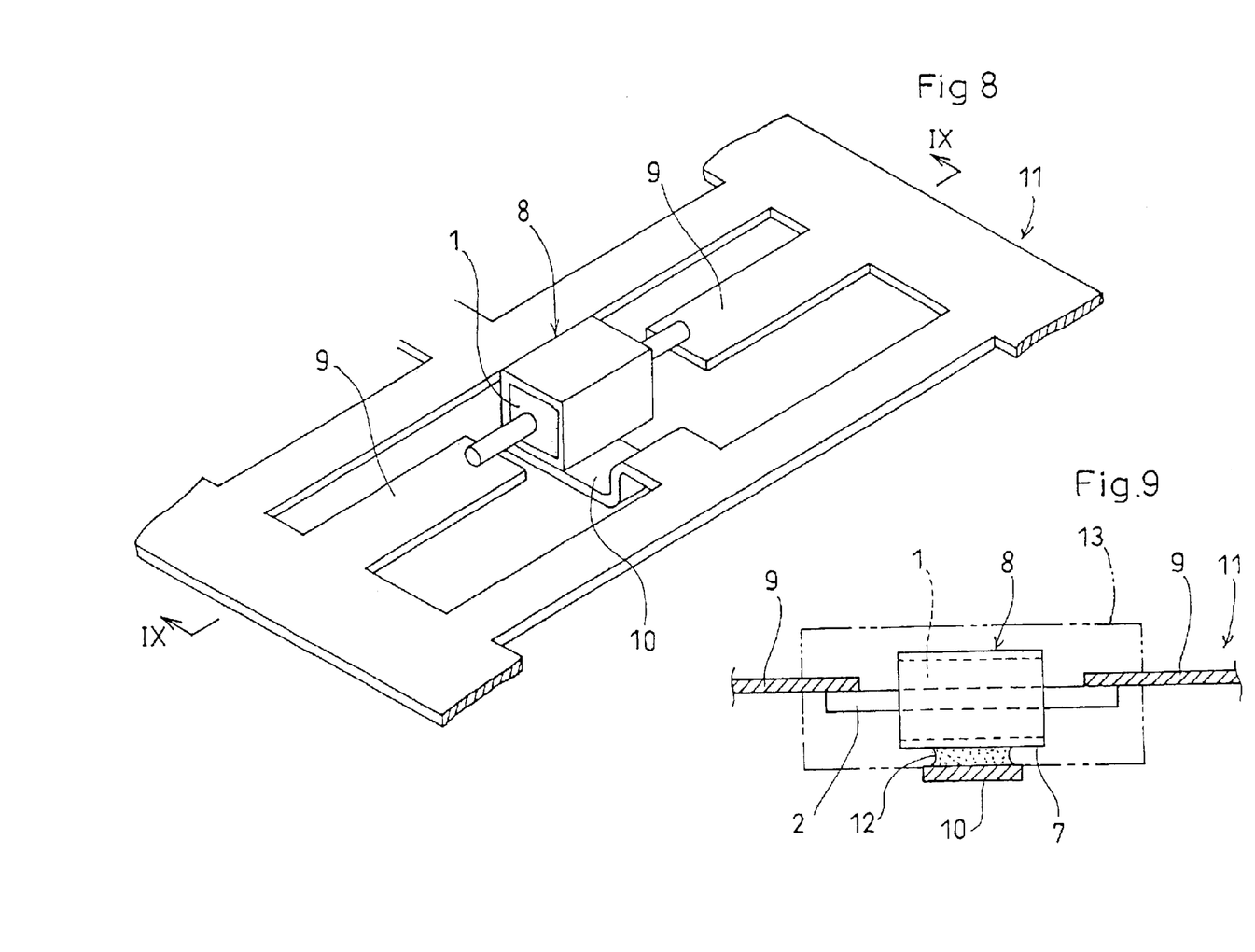
FIG. 8 is a perspective view showing the leadframe on which a capacitor element is mounted.
FIG. 9 is a sectional view taken along lines IX—IX in FIG. 8.

As shown in FIGS. 8 and 9, each set of the leads 9 and 10 is connected to a capacitor element 8 produced by the above-described method. For mounting the capacitor element 8 on the leadframe 11, each protruding portion of the anode bar 2 is connected to the relevant one of the anode leads 9 of the leadframe 11 by welding, for example, while the cathode layer 7 is connected to the cathode lead 10 via conductive paste 12 which may be applied beforehand on the cathode lead 10.

Then, the capacitor element 8 is enclosed by a resin package 13 which may be made of a thermosetting synthetic resin such as epoxy resin. As shown in FIG. 9, the resin package 13 is formed in a manner such that the respective anode leads 9 partially project from the opposite end surfaces of the package 13, and that the cathode lead 10 is exposed on the bottom surface of the package 13 at a position between the two anode leads 9.

Figure 10:
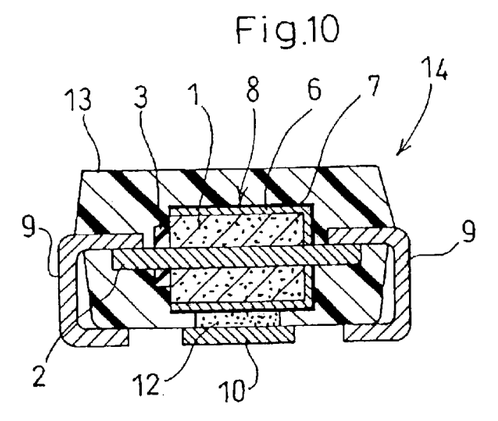
FIG. 10 is a sectional view showing a solid electrolytic capacitor produced by the first embodiment of the present invention.
Figure 11:
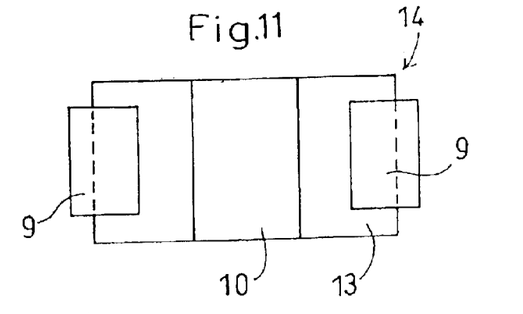
FIG. 11 is a bottom view showing the capacitor of FIG. 10.

Then, the anode leads 9 and the cathode lead 10 are cut off the leadframe 11. The free ends of the respective anode leads 9 are bent onto the bottom surface of the package 13. Thus, the product capacitor 14 as shown in FIGS. 10 and 11 is obtained.

In the solid electrolytic capacitor 14, the anode leads 9 are provided at both ends of the package 13, while the cathode lead 10 is provided at the bottom surface of the package 13 between the two anode leads 9. With this structure, referring to FIG. 10, the capacitor 14 can be mounted on a printed circuit board without causing a polarity error even when its right and left sides are reversed by the user. In addition, the distance between the cathode lead 10 and each anode lead 9 can be made smaller than that of the conventional solid electrolytic capacitor having the anode lead disposed at one end of the resin package and the cathode lead disposed at the opposite end of the package.

Reference is now made to FIGS. 12–20 illustrating a second embodiment of the present invention.

Figure 12:
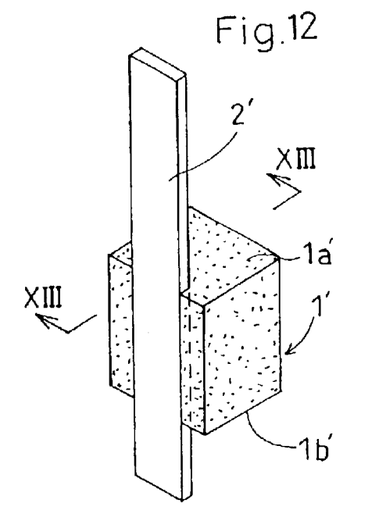
FIG. 12 is a perspective view showing an anode chip used for a second embodiment of the present invention.
Figure 13:
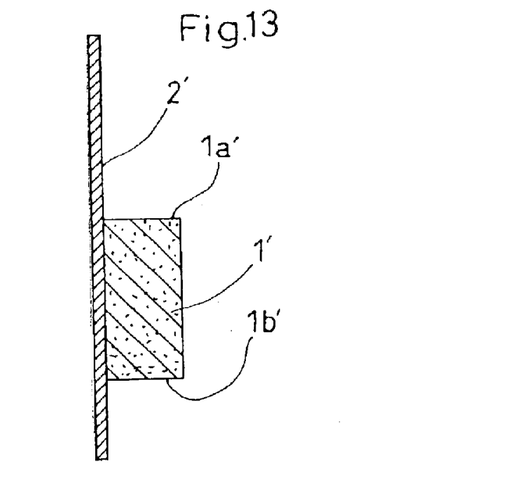
FIG. 13 is a sectional view taken along lines XIII—XIII in FIG. 12.

According to the second embodiment, as shown in FIG. 12, an elongated rectangular anode bar 2' is embedded in a selected side surface of the anode chip 1' in a manner such that one side of the bar 2' is entirely exposed, while the relevant parts of the remaining three sides of the bar 2' are concealed by the anode chip 1'. One end of the anode bar 2' extends upward beyond an end surface 1a' of the chip 1', while the opposite end of the bar 2' extends downward beyond the opposite end surface 1b' of the chip 1'(see also FIG. 13). The anode chip 1' is made by compression of valve metal powder (tantalum or niobium) into the prescribed form. The anode bar 2' is made of the same material as the chip 1'.

Figure 14:
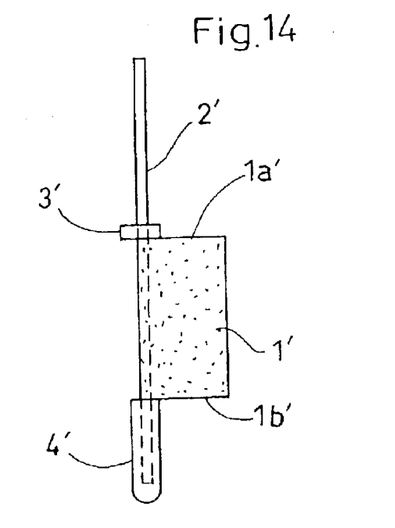
FIG. 14 shows the anode chip of FIG. 12 with a ring and a cover put around or on the relevant one of the protrusions of the anode bar.

As shown in FIG. 14, a water-repellant, synthetic resin ring 3' is put around the upwardly extending protrusion of the anode bar 2' so as to be held in contact with the end surface 1a' of the chip 1'. The other protrusion of the anode bar 2' is enclosed by a removable cover 4' made of a synthetic resin, for example.

Figures 15, 16, 17:
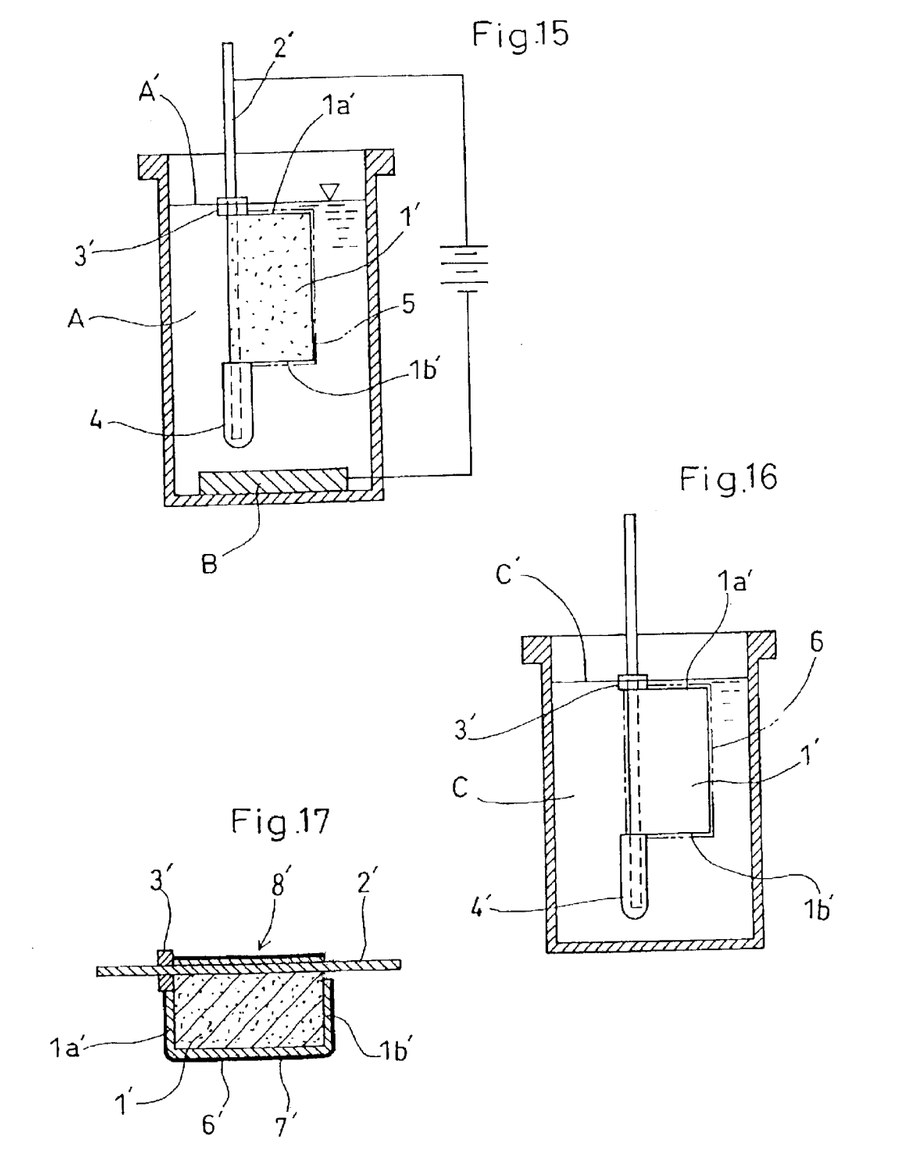
FIG. 15 illustrates an anodization step performed for the anode chip of FIG. 12.
FIG. 16 illustrates a solid electrolytic layer-forming step performed for the anode chip of FIG. 12.
FIG. 17 is a sectional view showing a capacitor element by the second embodiment of the present invention.

As shown in FIG. 15, the anode chip 1' is immersed in a reactive solution A such as a phosphoric acid solution. At this time, the surface 1a' of the chip 1' is directed upward, and the water-repellent ring 3' is partially dipped under the solution level A'. Below the anode chip 1', there is an electrode B connected to a power source. In this state, direct voltage is applied between the electrode B and the anode bar 2' to perform anodization for forming a dielectric layer (e.g. tantalum pentoxide) 5' on the metal particles of the anode chip 1'. According to the present invention, the formation of the dielectric layer 5' may be performed before the ring 3' and the cover 4' are put on the anode bar 2'.

Then, as shown in FIG. 16, the anode chip 1' is immersed in an aqueous solution C of manganese nitrate. At this time, the end surface 1a' of the anode chip 1' is directed upward, and the ring 3', held in contact with the end surface 1a', is partially put under the surface C' of the aqueous solution. After the solution C has penetrated well into the anode chip 1', the anode chip 1' is taken out of the solution C, and then baked. This may be repeated several times. As a result, solid electrolytic layers 6', made of metallic oxide such as manganese dioxide, are formed on the dielectric layer 5' of the anode chip 1'.

Then, a cathode layer 7' is formed on the electrolytic layer 6' of the chip 1'. The cathode layer 7' consists of a graphite lining sub-layer and a metal upper sub-layer made of silver or nickel, for example.

Then, the cover 4' is removed, and the protrusions of the anode bar 2' are trimmed to the prescribed lengths. Thus, the capacitor element 8' as shown in FIG. 17 is obtained.

Figures 18, 19, 20:
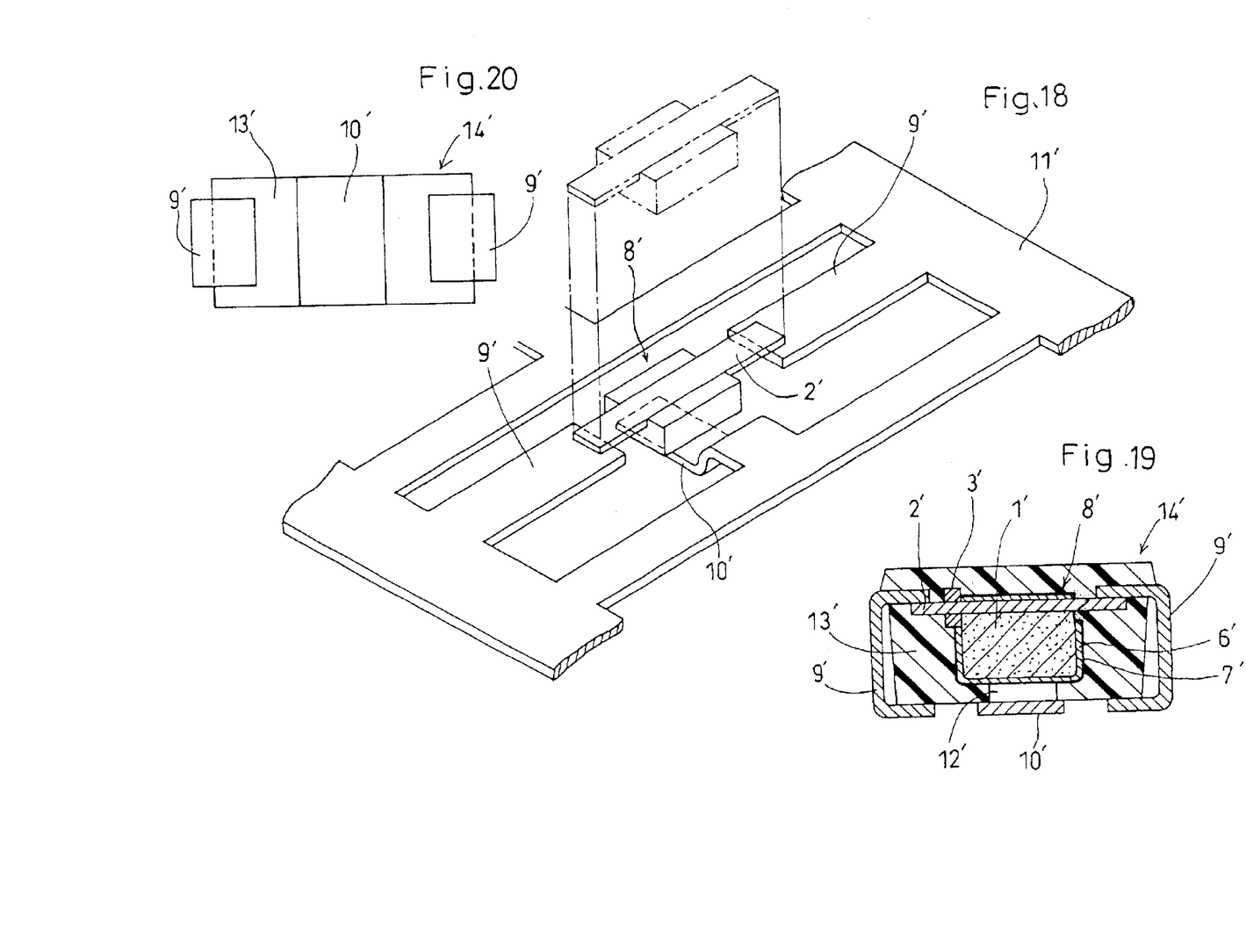
FIG. 18 is a perspective view showing a leadframe on which the capacitor element by the second embodiment is mounted.
FIG. 19 is a sectional view showing a solid electrolytic capacitor by the second embodiment of the present invention.
FIG. 20 is a bottom view showing the solid electrolytic capacitor of FIG. 19.

Referring to FIG. 18, the thus produced capacitor element 8' is mounted onto a leadframe 11'. For this, the protrusions of the anode bar 2' may be welded to the paired anode leads 9' of the leadframe 11', while the cathode layer 7' on the chip 1' may be bonded to the cathode lead 10' of the leadframe 11' via a conductive paste 12' which may be applied beforehand to the cathode lead 10'.

Then, the capacitor element 8' is enclosed by a package 13' made of a thermosetting synthetic resin such as epoxy resin. At this time, the anode leads 9' are allowed to project outward from opposite end surfaces of the package 13'. On the other hand, the cathode lead 10' is exposed at the bottom surface of the package 13' between the two anode leads 9'.

Then, the anode leads 9' and the cathode lead 10' are cut off the leadframe 11'. The anode leads 9' projecting from the package 13' are bent onto the bottom surface of the package 13'. Thus, the product solid electrolytic capacitor 14' as shown in FIGS. 19 and 20 is obtained.

As readily understood, the capacitor 14' of the second embodiment can enjoy the same advantages as the capacitor 14 of the first embodiment described above. First, because of the lateral symmetry of the lead arrangement, an operator who wishes to mount the capacitor 14' onto a printed circuit board does not need to worry about the polarity alignment. Second, due to the central arrangement of the cathode lead 10', the distance between the cathode lead 10' and the anode leads 9' can be made smaller than is conventionally possible.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A method of making a solid electrolytic capacitor, the method comprising the steps of:

preparing an anode chip made of a valve metal and including a first surface and a second surface opposite to the first surface, the anode chip being provided with an anode bar protruding from the first surface and the second surface of the chip;

forming a dielectric layer on the anode chip by anodization;

enclosing, by a removable cover, a portion of the anode bar that protrudes from the second surface of the anode chip;

forming a solid electrolytic layer by immersing the anode chip in a solid electrolytic layer-forming solution and then baking the anode chip;

forming a cathode layer on the solid electrolytic layer;

removing the cover;

mounting a capacitor element produced by the above-mentioned steps on a metal leadframe, so that portions of the anode bar protruding from the first and the second surfaces of the anode chip are connected to paired anode leads of the leadframe, respectively, and that the cathode layer on the anode chip is connected to a cathode lead of the leadframe that is arranged between the paired anode leads;

enclosing the capacitor element by a synthetic resin package in a manner such that the paired anode leads are exposed at opposite ends of the package, and that the cathode lead is exposed at a portion of the package located between the paired anode leads; and cutting the paired anode leads and the cathode lead off the leadframe.

2. The method according to claim 1, wherein the enclosing step with the cover is performed before the forming step of the dielectric layer on the anode chip.

3. The method according to claim 1, wherein the anode bar is welded to the paired anode leads, the cathode layer being bonded to the cathode lead by a conductive paste.

4. A solid electrolytic capacitor comprising:

a capacitor element produced by the steps of: preparing an anode chip made of a valve metal and including a first surface and a second surface opposite to the first surface, the anode chip being provided with an anode bar protruding from the first surface and the second surface of the chip; forming a dielectric layer on the anode chip by anodization; enclosing, by a removable cover, a portion of the anode bar that protrudes from the second surface of the anode chip; forming a solid electrolytic layer by immersing the anode chip in a solid electrolytic layer-forming solution and then baking the anode chip; forming a cathode layer on the solid electrolytic layer; and removing the cover;

a first anode lead connected to a portion of the anode bar that protrudes from the first surface of the anode chip;

a second anode lead connected to a portion of the anode bar that protrudes from the second surface of the anode chip;

a cathode lead connected to the cathode layer formed on the anode chip, the cathode lead being arranged between the paired anode leads; and a synthetic resin package enclosing the capacitor element;

wherein the paired anode leads are exposed at opposite ends of the package, the cathode lead being exposed at a portion of the package between the paired anode leads.

5. A solid electrolytic capacitor comprising:

an anode chip including a first surface and a second surface opposite to the first surface;

an anode bar including a first portion protruding from the first surface of the chip and a second portion protruding from the second surface of the chip;

a cathode layer formed on the anode chip;

a first anode lead connected to the first portion of the anode bar;

a second anode lead connected to the second portion of the anode bar;

a cathode lead connected to the cathode layer; and a resin package enclosing the anode chip and the anode bar, the package including a first end portion and a second end portion opposite to the first end portion;

wherein the first anode lead is exposed at the first end portion of the package, the second anode lead being exposed at the second end portion of the package, the cathode lead being exposed at a location between the first anode lead and the second anode lead.

* * * * *